United States Patent [19]

Jokay

[11] 4,017,644
[45] Apr. 12, 1977

[54] HIGH CALORIE FOOD BAR

[75] Inventor: Louis Jokay, Niles, Ill.

[73] Assignee: G. D. Searle & Co., Chicago, Ill.

[22] Filed: Aug. 25, 1975

[21] Appl. No.: 607,435

[52] U.S. Cl. .............................. 426/540; 426/549; 426/613; 426/660; 426/661; 426/804

[51] Int. Cl.² .......................................... A23L 1/10

[58] Field of Search .......... 426/250, 540, 549, 553, 426/589, 601, 658, 804, 808, 810, 613, 660, 661

[56] References Cited

UNITED STATES PATENTS

| | | | |
|---|---|---|---|
| 2,332,074 | 10/1943 | Griffith | 426/613 |
| 2,442,928 | 6/1948 | MacMasters | 426/660 |
| 3,431,112 | 3/1969 | Durst | 426/810 |
| 3,830,948 | 8/1974 | Fischer | 426/660 |
| 3,851,083 | 11/1974 | Brookings | 426/658 |

*Primary Examiner*—Norman Yudkoff
*Assistant Examiner*—Martin G. Mullen
*Attorney, Agent, or Firm*—John J. McDonnell

[57] ABSTRACT

The present invention concerns a high calorie food bar essentially devoid of sodium, potassium, and protein comprising a baked dough having 150–250 parts by weight of pregelatinized starch which has a viscosity in water of 250–500 Brabender units, 300–500 parts by weight of edible vegetable oil, 200–400 parts by weight sugar, and consumable coloring and flavoring. Unexpectedly the oil in this high calorie food bar does not separate or oil out upon baking. The high calorie food bar of the present invention is a tasty, appetizing and nutritious food for renal and other patients who require a diet high in calories and restricted in sodium, potassium and protein content. The present product contains about 6 calories per gram.

4 Claims, No Drawings

HIGH CALORIE FOOD BAR

The present invention concerns a high calorie food bar essentially devoid of sodium, potassium and protein comprising a baked dough having 150–250 parts by weight of pregelatinized starch which has a viscosity in water of 250–500 B.U. (Brabender Units), 300–500 parts by weight of edible vegetable oil having 3.5–5% Solid Fat Index at 92°, 200–400 parts by weight sugar, and consumable coloring and flavoring.

Pregelatinized starch suitable for practicing the present invention is set out in U.S. Pat. No. 2,641,547, June 9, 1953, and that specification is incorporated by reference in its entirety. The pregelatinized starch useful in the present invention is prepared by conventional art recognized techniques. Typical of these operations is the drum drying of an aqueous slurry at atmospheric pressure under usual drum drying conditions. For example, a conventional starch gelatinization operation involves the use of a 10–20% solids starch slurry and a drum temperature equivalent to that of a steam pressure of 80–120 pounds per square inch. The gelatinized starch is taken off the drum in the form of flakes. These flakes may be used as is or powdered and passed through standard sieves.

This starch is characterized as having a viscosity of 250–500 B.U. (Brabender units) in water, i.e. 40 grams starch and 50 m. methyl alcohol are diluted to 250 ml with buffer having pH of 6.0; the Brabender viscosity is read after 15 minutes. This pregelatinized starch is also characterized as forming a free flowing dry composition when in combination with 2–6 times its weight in edible vegetable oil or fat melting below 130° F. Although the flake-like material described in U.S. Pat. No. 2,641,547 is suitable, generally powdered material passing through a No. 50 U.S. standard sieve is used. The starch is preferably cornstarch but wheat starch, tapioca starch, arrowroot starch, and waxy maize starch are suitable. The starch should be of high quality and essentially devoid of protein, sodium and potassium.

Pregelatinized cornstarch, sold under the trademark Dri-Short by American Maize Products Co., 250 Park Ave., N.Y., N.Y., is particularly preferred.

Edible vegetable oils such as cottonseed, sunflower, corn, safflower, and blends thereof which are partially hydrogenated such that the polyunsatured to saturated ratio is about 28/16, are semiplastic in the 50°–70° F range and liquid above 80° F are suitable for practicing the present invention. A Solid Fat Index (SFI) profile of a particularly suitable oil is as follows:

| °F      | 50° | 70° | 80°     | 92°    | 100° |
|---------|-----|-----|---------|--------|------|
| % Solid | 8   | 7   | 4.0–5.6 | 3.5–5  | 2–3  |

Thus a blend of partially hydrogenated vegetable oils which are semiplastic at 60°–65° F and have a Wiley melting point of 92° F sold under the trade name Pour-N-Fry by Swift & Co., Chicago, Ill., is particularly suitable for practicing the present invention. This blend contains BHA (Butylated Hydroxy Anisole) and BHT (Butylated Hydroxy Toluene) to improve stability to oxidation and Dimethyl polysiloxan as an antifoaming agent.

For purposes of the present invention sugar is defined in the generic sense to refer to commonly available food materials such as sucrose, glucose, dextrose, and also low dextrose equivalent (D.E.) maltodextrins.

Consumable flavors such as lemon, orange, chocolate, almond, peanut butter, pecan, cinnamon, and pistachio may be conveniently combined with above described ingredients to improve the palatability of the high calorie food bar and consumable coloring agents may be added to improve the visual appeal of the high calorie food bar. Likewise, vitamins such as A, $B_1$, $B_2$, $B_6$, $B_{12}$, C, D, E, and niacin may be added in appropriate amounts to supply any desired percentage of the minimum daily requirement. Minerals such as calcium and phosphorous in the form of consumable soluble salts, iodine, iron (ferrous fumarate) or magnesium (magnesium oxide) may also be added.

Renal patients require diets restricted in sodium, potassium, and protein content. Table I sets out the recommended sodium, potassium and protein intake for a renal patient and the intake of a normal adult.

TABLE 1

|           | Renal       | Normal       |
|-----------|-------------|--------------|
| protein   | 17–20 gm.   | 65 gm.       |
| potassium | 18–19 Meq.  | 50–100 Meq.  |
| sodium    | 13–15 Meq.  | 100–300 Meq. |

The restrictive renal diet provides limited caloric intake, since the reduced amounts of sodium, potassium, and protein serve to act as limiting factors in the diet. Table II sets out a diet recommended for renal patients.

TABLE II

Mayo Clinic Restricted Diet for Renal Patients:

|                                           | SERVING (Grams) | PROTEIN (Grams) | WATER (Grams) | CALORIES (Per Serving) |
|-------------------------------------------|-----------------|-----------------|---------------|------------------------|
| BREAKFAST                             |                 |                 |               |                        |
| Puffed Rice                               | 15              | 1.61            | 26.07         | 57.35                  |
| Whipping Cream (32% Fat)                  | 60              | 1.50            | 37.30         | 180.00                 |
| Low Protein Bread                         | 50              | 0.27            | 24.40         | 93.40                  |
| Margarine, Salt Free                      | 15              | 0.09            | 2.33          | 108.00                 |
| Jam                                       | 15              | 0.09            | 4.35          | 40.80                  |
| Strawberries, Whole, Frozen, and Sweetened | 50             | –.26            | 41.46         | 31.69                  |
| NOON MEAL                             |                 |                 |               |                        |
| Hard Boiled Egg                           | 50              | 6.45            | 36.85         | 81.50                  |
| Lettuce                                   | 50              | 0.49            | 38.75         | 9.66                   |
| Mayonnaise, Salt Free                     | 15              | 0.16            | 2.26          | 107.70                 |
| Low Protein Bread                         | 50              | 0.27            | 24.40         | 93.40                  |
| Margarine, Salt Free                      | 15              | 0.09            | 2.33          | 108.00                 |
| Fruit Cocktail                            | 50              | 0.26            | 41.46         | 31.69                  |
| EVENING MEAL                          |                 |                 |               |                        |
| Scrambled Eggs                            | 50              | 6.45            | 36.80         | 81.50                  |
| Baked Potatoes                            | 50              | 1.46            | 40.50         | 35.50                  |

TABLE II-continued

Mayo Clinic Restricted Diet for Renal Patients:

|  | SERVING (Grams) | PROTEIN (Grams) | WATER (Grams) | CALORIES (Per Serving) |
|---|---|---|---|---|
| Low Protein Bread | 50 | 0.27 | 24.40 | 93.40 |
| Carrots, Salt Free (Cooked) | 50 | 0.49 | 38.75 | 9.66 |
| Margarine, Salt Free | 15 | 0.09 | 2.33 | 108.00 |
| Jam | 15 | 0.09 | 4.35 | 40.80 |
| Lemon Drops | 30 | 0.00 | 0.42 | 115.80 |

FOR ALL THREE MEALS:
Total Protein – 20 gm.
Total Moisture – 430 gm.
Calories – 1,430

Typically consumable coloring and flavoring are blended into 300–500 parts by weight of the edible vegetable oil, followed by blending of 150–250 parts by weight of the pregelatinized starch and then 200–400 parts by weight of sugar. The mixture is thoroughly mixed, divided into cookie or bar-like portions of about 15–20 grams, and baked in a 325°–375° oven for 10–25 minutes or until crisp crust is formed.

In a preferred embodiment orange cookies are prepared by blending 1.1 parts of citric acid, 1.86 parts by weight of orange oil, and 0.66 parts of yellow lake dye into 442 parts of edible vegetable oil. Then 221 parts of pregelatinized starch are blended into the oil to form a dough. 332 Parts of confectioners sugar are blended into the dough. The dough is placed into cookie molds and baked in an oven at 340°–375° for 10–25 minutes, preferably 350°–355° F for 15–18 minutes or until a hardened crunchy skin is formed. The cookie is frozen and packaged for storing.

In another preferred embodiment lemon cookies are prepared as indicated in the above example by using 439 parts of edible vegetable oil, 2.86 parts by weight of citric acid, 0.66 parts by weight of yellow lake dye and 7.1 parts of lemon oil, 219 parts by weight of pregelatinized starch, and 329 parts by weight of confectioners sugar. The resulting dough is formed and baked in an oven at 340°–375° for 10–20 minutes, preferably 350°–355° F for 15–18 minutes or until a hard crunchy skin is formed. The baked cookies are frozen and packaged for storage.

In a most preferred embodiment the previously described orange and lemon cookies are prepared in a temperature controlled mixing bowl by blending the citric acid and orange or lemon flavoring in the edible vegetable oil at 50° F, the pregelatinized starch is blended at 60°–62° F, and the confectioners sugar is blended at 69°–70° F. The density of the resulting dough is adjusted to 0.82 to 0.85. If the density is not in this range it can be increased by raising the temperature of the dough or lowered by decreasing the temperature of the dough. Approximately 16 grams of this dough is placed in a mold and baked in a 350°–355° F oven for 17–18 minutes in the case of the orange cookie or 13–15 minutes for the lemon cookie. The cookie is allowed to cool for 5 minutes and then frozen at −100° to −140° F for about 22 minutes. The high calorie food bar (cookie) is packaged and stored in a freezer. This procedure provides a high calorie food bar weighing about 16 grams and having the following nutritional profile:

| Calories | 100 |
|---|---|
| Protein | 0 grams |
| Carbohydrate | 9 grams |
| Fat | 7 grams |
| Sodium | 2 mg |
| Potassium | 0 |

The nearest prior art appears to be U.S. Pat. No. 2,641,547 filed June 9, 1953, wherein pregelatinized starch in combination with 2–6 parts of fat and seasoning is disclosed as a dry free flowing powder for seasoning soup by releasing the fat and seasoning when placed in boiling water. Thus, the prior art teaches a soup flavoring composition for releasing fat upon heat treatment or cooking, i.e. boiling.

Unexpectedly it has been found that a dough prepared from 150–250 parts by weight of the aforementioned pregelatinized starch, 300–500 parts of edible vegetable oil, 200–400 parts by weight sugar, and consumable coloring and flavoring does not release oil when baked in an oven at 325°–375° F for 10–25 minutes or until a crunchy, crisp crust is formed. This unexpected result provides a tasty, appetizing and nutritious food for renal and other patients who require a diet high in calories and restricted in sodium, potassium, and protein.

The hereinafter set forth examples are illustrations of the present invention and they are not intended to limit the invention in spirit or scope.

EXAMPLE 1

1.1 Parts of citric acid, 1.86 parts by weight of orange oil and 0.66 parts by weight of yellow lake dye is blended into 442 parts by weight of edible vegetable oil having a (polyunsaturate/saturate) ratio of 28/16 and having 3.5–5.0% Solid Fat Index and liquid above 80° F and sold under the trade name of Pour 'N Fry by Swift and Co., Chicago, Illinois, in a temperature controlled mixing bowl at 50° F. 221 Parts by weight of pregelatinized starch having a Brabender viscosity of 250–500 in water and sold under the trade name of Dri-Short by American Maize Products Co., N.Y., N.Y. is blended into the colored and flavored edible vegetable oil at 60°–62° F. 332 Parts by weight of confectioners sugar is blended in at 69°–70° F. The density of the resulting dough is adjusted to 0.82–0.85 by heating or cooling as necessary. The dough is placed in a cookie mold, about 16 grams per cookie, and baked in an oven at 350°–355° F for 17–18 minutes. The cookies are rotated after about 9 minutes. The baked cookies are removed from the oven and cooled for 5 minutes and then quick-frozen at −100° to −140° F for about 22 minutes. The cookies are packaged and stored in the frozen state.

EXAMPLE 2

Following the procedure in Example 1, 150 parts by weight of pregelatinized corn starch, 500 parts by weight of edible oil and 200 parts of confectioners sugar are used to replace those quantities in that example.

EXAMPLE 3

Following the procedure set out in Example 1, 150 parts by weight of pregelatinized cornstarch, 300 parts by weight of edible vegetable oil, and 400 parts by weight of confectioners sugar are used to replace those quantities in that example.

EXAMPLE 4

Following the procedure in Example 1, the confectioners sugar is replaced with 300 parts by weight of maltodextrin.

I claim:

1. A high calorie food bar of dough baked to a crisp crust and essentially devoid of sodium, potassium, and protein, consisting essentially of the following ingredients:
   a. 150–250 parts by weight of pregelatinized starch which has a viscosity in water of 250–500 Brabender units,
   b. 300–500 parts by weight of edible vegetable oil which is semiplastic at 50°–70° F and liquid above 80° F,
   c. 200–400 parts by weight sugar, and
   d. consumable coloring and flavoring.

2. A high calorie food bar a dough baked to a crisp crust and essentially devoid of sodium, potassium, and protein, consisting essentially of the following ingredients:
   a. 150–250 parts by weight of pregelatinized cornstarch which has a viscosity in water of 250–500 Brabender units,
   b. 300–500 parts by weight of edible vegetable oil having 3.5–5% Solid Fat Index at 92° F,
   c. 200–400 parts by weight sugar, and
   d. consumable coloring and flavoring.

3. A high calorie food bar of dough baked to a crisp crust and essentially devoid of sodium, potassium, and protein, consisting essentially of the following ingredients:
   a. 221 parts by weight pregelatinized cornstarch,
   b. 442 parts by weight edible vegetable oil,
   c. 332 parts by weight confectioners sugar,
   d. 1.8 parts by weight of orange oil,
   e. 1.1 parts by weight of citric acid, and
   f. 0.6 parts of yellow lake dye.

4. A high calorie food bar of dough baked to a crisp and essentially devoid of sodium, potassium and protein, consisting essentially of the following ingredients:
   a. 219 parts by weight pregelatinized starch,
   b. 439 parts by weight edible vegetable oil,
   c. 329 parts by weight confectioners sugar,
   d. 2.86 parts by weight citric acid,
   e. 0.66 parts by weight yellow lake dye, and
   f. 7.1 parts by weight lemon oil.

* * * * *